United States Patent Office 3,444,226
Patented May 13, 1969

3,444,226
HETEROCYCLIC ALUMINUM COMPOUNDS
Horst W. Schmank, Ringgold, Ga., and Stewart M. Beekman, Signal Mountain, and James M. Holbert, Lookout Mountain, Tenn., assignors to The Chattanooga Medicine Co., Chattanooga, Tenn., a corporation of Tennessee
No Drawing. Filed May 2, 1966, Ser. No. 546,557
Int. Cl. C07f 5/06
U.S. Cl. 260—448                                10 Claims

ABSTRACT OF THE DISCLOSURE

Heterocyclic organic aluminum compounds particularly useful as anti-perspirants, and consisting of derivatives of 2-chloro-1,3,2-dioxalumolanes, the compounds being soluble in absolute alcohol and compatible with fluorocarbon propellants.

---

The present invention relates to heterocyclic organic aluminum compounds and to methods for their preparation. The compounds of the present invention are particularly useful for anti-perspirants. Because of their solubility in absolute alcohol, and their compatibility with fluorocarbon propellants, they are readily adaptable for use in aerosol formulations.

The requirements for successful dispensing of anti-perspirant compositions by aerosol are quite rigorous. The anti-perspirant compositions must form clear, homogeneous systems with anhydrous (95 to 100%) ethanol and fluorocarbon propellants. They must not precipitate or gel within reasonable storage periods. They should contain only trace amounts of iron, since this metal inactivates compounds such as "hexachlorophene" and also catalyzes degradation of some organic perfume materials. The anti-perspirant compositions should have a low acidity pH range on the order of 3.5 to 4.5 when mixed with water. They must be sufficiently soluble to be effective and they must be safe to use daily on the skin. Most important, they must be effective in inhibiting the flow of perspiration on the axillae.

Aluminum chloride hexahydrate has been used as an anti-perspirant composition for a long period of time. Although it is compatible with anhydrous ethanol, and compatible with propellants, and as an effective anhydrotic it is too acid to use daily, and has adversely affected the tensile strength of fabrics. Less acid materials such as aluminum phenolsulphonate has been used as an anti-perspirant composition, but the anti-perspirant activity of this materials is quite low. The patent literature also includes a disclosure of aluminum chlorhydroxide alcoholate having 0.25 to 1 hydroxyl for each aluminum atom in anti-perspirant compositions (U.S. Patent No. 2,823,169). These materials, however, are rather unstable and they contain more than a trace amount of iron, usually including on the order of 40 to 80 parts per million of iron. U.S. Patent No. 2,872,379 discloses a series of alkoxy aluminum chlorides as anti-perspirants, but these compounds are limited in usefulness because of their very low solubility in anhydrous alcohol.

One of the objects of the present invention is to provide an improved series of aluminum containing anti-perspirant materials which are readily soluble in ethanol of 95 to 100% concentration, and which are compatible with conventional fluorocarbon propellants.

Another object of the invention is to provide a series of anti-perspirant compositions in which the aluminum atom is part of a heterocyclic ring including oxygen and carbon atoms, and being not unduly acidic.

A further object of the invention is to provide a series of heterocyclic aluminum compounds which have anti-perspirant activity and which do not gel or become otherwise degraded upon extended storage periods.

A further object of the invention is to provide improved aerosol compositions including the novel heterocyclic aluminum compounds of the present invention.

The compounds of the present invention have the following generic formula:

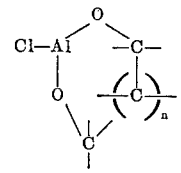

where $n$ is an integre from 0 to 1.

As indicated in the above structural formula, the heterocyclic compounds of the present invention include a ring structure which may number from 5 to 6 atoms in the ring. The linkage:

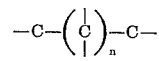

forming part of the above identified structural formula is preferably a residue of an aliphatic polyhydric alcohol having from 2 to 6 carbon atoms per molecule and having hydroxyl atoms on carbon atoms which are spaced apart by no more than one intervening carbon atom.

The valance bonds shown in the above structural formula should be attached to groups which do not have an adverse effect upon the solubility or the acidity of the resulting compound, and should preferably be either hydrogen atoms, hydroxyl groups, or low alkyl chains (up to 3 carbon atoms).

The compounds of the present invention are prepared by reacting substantially equimolar proportions of chloro-aluminum diisopropoxide and a 2 to 6 carbon atom aliphatic polyhydric alcohol having hydroxyl groups on carbon atoms which are spaced apart by no more than one intervening carbon atom in a reaction medium of substantially anhydrous alcohol. The reaction is quite exothermic and usually requires no added heat to initiate it. After the reaction has proceeded, the excess anhydrous alcohol is removed, and the resulting reaction product is dried, preferably under reduced pressure or vacuum conditions.

The following compounds are illustrative of the types of compounds which can be prepared and used in accordance with the present invention:

(a) 2-chloro-4-methyl-1,3,2-dioxalumolane

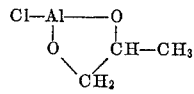

(b) 2-chloro-4,5-dimethyl-1,3,2-dioxalumolane

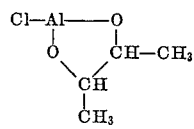

(c) 2-chloro-4-methyl-5-ethyl-1,3,2-dioxalumolane

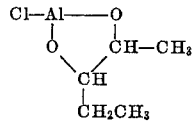

(d) 2-chloro-4,5-diethyl-1,3,2-dioxalumolane

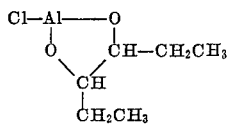

(e) 2-chloro-4-hydroxymethyl-1,3,2-dioxalumolane

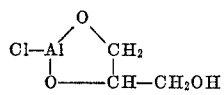

(f) 2-chloro-1,3,2-dioxaluminane

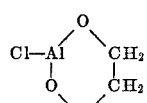

(g) 2-chloro-4-methyl-1,3,2-dioxaluminane

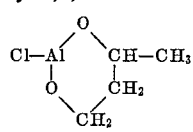

(h) 2-chloro-5-hydroxy-1,3,2-dioxaluminane

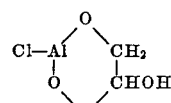

(i) 2-chloro-4-ethyl-6-methyl-1,3,2-dioxaluminane

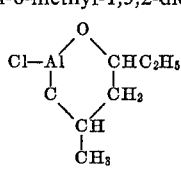

(j) 2-chloro-4-propyl-5-ethyl-1,3,2-dioxaluminane

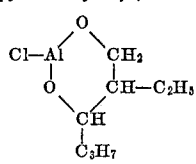

The following specific examples illustrate methods for the preparation of selected members of the new group of compounds.

EXAMPLE I

Preparation of 2-chloro-4-methyl-1,3,2-dioxalumolane

One mole (180.5 grams) of chloroaluminum diisopropoxide dissolved in 200 ml. of anhydrous isopropyl alcohol was placed in a reaction vessel equipped for efficient stirring and reflux. One mole (76.1 grams) of propylene glycol (propanediol 1,2) in 100 cc. of anhydrous isopropyl alcohol was added slowly with rapid stirring. The reaction was quite exothermic. After the addition of the glycol was complete, the reaction mixture was refluxed for an hour or so and the bulk of the excess isopropyl alcohol was removed by distillation. Final removal of alcohol and drying was done at a temperature of 70 to 80° C. under reduced pressure. Unless such drying procedures are employed, the product appears to crystallize with a maximum of ½ mole of isopropyl alcohol. The reaction proceeds according to the following equation:

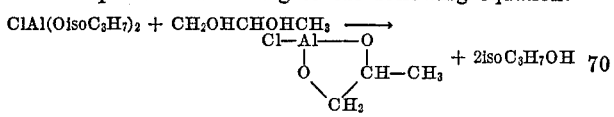

The following elemental analysis was made.
Theory for $ClAlC_3H_6O_2 \cdot \frac{1}{2}C_3H_7OH$: Cl, 21.4; Al, 16.3. Found: Cl, 21.77; Al, 16.92. Al:Cl ratio=1.00:0.98.

EXAMPLE II

Preparation of 2-chloro-4,5-dimethyl-1,3,2-dioxalumolane

With the same procedure described in Example I, one mole (180.5 grams) of chloroaluminum diisopropoxide was reacted with one mole (90 grams) of 2,3-butanediol and the product was isolated as in Example I. The elemental analysis follows:
Theory for $ClAlC_4H_8O_2$: Cl, 23.56; Al, 17.93. Found: Cl, 22.88; Al, 17.01. Al:Cl ratio=1.00:1.02.

EXAMPLE III

Preparation of 2-chloro-4-methyl-5-ethyl-1,3,2-dioxalumolane

The procedure specified in Example I was carried out with substantially equimolar proportions of chloroaluminum diisopropoxide and pentanediol-2,3. The resulting product was 2-chloro-4-methyl-5-ethyl-1,3,2-dioxalumolane.

EXAMPLE IV

Preparation of 2-chloro-4,5-diethyl-1,3,2-dioxalumolane

The procedure of Example I was repeated except that the glycol used was hexanediol-3,4. The resulting product was recovered as in Example I, and consisted primarily of 2-chloro-4,5-diethyl-1,3,2-dioxalumolane.

EXAMPLE V

Preparation of 2-chloro-1,3,2-dioxaluminane

One mole (180.5 grams) of chloroaluminum diisopropoxide was reacted with one mole (76.0 grams) of propanediol-1,3 under the conditions specified in Example I, and the product isolated as described in that example. The product consisted largely of the compound 2-chloro-1,3,2-dioxaluminane. The elemental analysis was as follows.
Theory: Cl, 26.00; Al, 19.77. Found: Cl, 24.01; Al, 17.54. Al:Cl ratio=1.00:1.04.

EXAMPLE VI

Preparation of 2-chloro-4-methyl-1,3,2-dioxaluminane

Following the same procedure as in the preceding examples, one mole (180.5 grams) of chloroaluminum diisopropoxide was reacted with one mole (90 grams) of butanediol-1,3, and the product was isolated as described in Example I. The product consisted largely of the compound 2-chloro-4-methyl-1,3,2-dioxaluminane. The following elemental analysis was made.
Theory: Al, 17.93; Cl, 23.56. Found: Al, 16.78; Cl, 22.65. Al:Cl ratio=1.00:1.03.

EXAMPLE VII

Preparation of 2-chloro-5-hydroxy-1,3,2-dioxaluminane

Following the same procedure of Example I, one mole (180.5 grams) of chloroaluminum diisopropoxide was reacted with one mole (92.0 grams) of glycerol to produce a product which corresponds to the compound of 2-chloro-5-hydroxy-1,3,2-dioxaluminane. The following elemental analysis was made.
Theory: Al, 14.82; Cl, 19.50; Found: Al, 14.76; Cl, 19.31. Al:Cl ratio=1.00:1.00.

It is also possible that the above reaction produced a five membered ring structure, and specifically the compound 2-chloro-4-hydroxymethyl-1,3,2-dioxalumolane.

EXAMPLE VIII

Preparation of 2-chloro-4-ethyl-6-methyl-1,3,2-dioxaluminane

This compound was prepared in the manner of the other examples by reacting one mole (180.5 grams) of chloroaluminum diisopropoxide with one mole (118.2 grams) of hexylene glycol-2,4.

EXAMPLE IX

Preparation of 2-chloro-4-propyl-5-ethyl-1,3,2-dioxaluminane

This compound was prepared by reacting one mole of chloroaluminum diisopropoxide with one mole of 2-ethyl hexanediol-1,3. The product is recovered as in the other examples.

All of the compounds prepared according to the foregoing examples are soluble in water as well as in 95 to 100% ethanol. Consequently, they are useful as antiperspirants in aerosols, creams, lotions, and the like.

The following examples illustrate the manner in which the compounds of the present invention can be incorporated into suitable aerosol formulations.

EXAMPLE X

Solid granular 2-chloro-4-methyl-1,3,2-dioxalumolane was dissolved in three parts of anhydrous ethanol to yield a 25% w./w. solution. An aerosol was prepared from this 25% solution based on the following formula:

|  | Percent w./w. |
|---|---|
| 25% w./w. ethanol silution | 30.00 |
| Hexachlorophene, U.S.P. | 0.25 |
| Myristyl lactate | 1.00 |
| Perfume | 0.50 |
| Anhydrous ethanol | 23.25 |
| Propellant (40% dichlorodifluoromethane, 60% dichlorotetrafluoroethane) | 45.00 |

The aerosol had a pressure of about 32 pounds per square inch gauge. After storage for one month at 110° F., it evidenced no gelling or precipitation.

EXAMPLE XI

Another aerosol formulation was made up using 5 grams of the anti-perspirant material of Example X dissolved in 50 ml. of 98% ethanol. The alcoholic solution was packed in a coated glass aerosol using the following formula:

|  | Percent w./w. |
|---|---|
| Anti-perspirant | 5 |
| 98% ethanol | 50 |
| Propellant as in Example X | 45 |

The resulting aerosol had a pressure of 32 pounds per square inch gauge. It evidenced excellent spray characteristics and stability upon storage.

From the foregoing it will be understood that the compositions of the present invention are improved chloroaluminum compounds which are readily soluble in ethanol and are compatible with conventional aerosol propellants. What is more, they appear to be completely stable upon storage without gelling or precipitation.

It should be evident that various modifications can be made to the described embodiments without departing from the scope of the present invention.

We claim as our invention:

1. A chemical compound having the formula:

$$\text{Cl—Al} \begin{matrix} \diagup \text{O} \diagdown \\ \phantom{x} \end{matrix} \begin{matrix} \text{—C—} \\ \diagup(\text{C})_n \diagdown \\ \text{—C—} \end{matrix}$$

where $n$ is an integer from 0 to 1, the unsatisfied valences in the above formula being attached to at least one member of the group consisting of hydrogen atoms, hydroxyl groups, and alkyl radicals containing up to 3 carbon atoms and the linkage —C—(C)$_n$—C— is a residue of an aliphatic polyhydric alcohol containing from 3 to 6 carbon atoms per molecule.

2. The compound 2-chloro-4-ethyl-6-methyl-1,3,2-dioxaluminane having the structural formula:

$$\text{Cl—Al} \begin{matrix} \diagup \text{O} \diagdown \\ | \phantom{xx} | \\ \text{O} \phantom{xx} \text{CH—C}_2\text{H}_5 \\ \diagdown \phantom{x} \diagup \\ \text{CH}_2 \\ | \\ \text{CH} \\ | \\ \text{CH}_3 \end{matrix}$$

3. The compound 2-chloro-4-methyl-1,3,2-dioxalumolane having the structural formula:

$$\text{Cl—Al———O} \\ | \phantom{xxx} | \\ \text{O} \phantom{xx} \text{CH—CH}_3 \\ \diagdown \phantom{x} \diagup \\ \text{CH}_2$$

4. The compound 2-chloro-4,5-dimethyl-1,3,2-dioxalumolane having the structural formula:

$$\text{Cl—Al———O} \\ | \phantom{xxx} | \\ \text{O} \phantom{xx} \text{CH—CH}_3 \\ \diagdown \phantom{x} \diagup \\ \text{CH} \\ | \\ \text{CH}_3$$

5. The compound 2-chloro-4-methyl-5-ethyl-1,3,2-dioxalumolane having the structural formula:

$$\text{Cl—Al———O} \\ | \phantom{xxx} | \\ \text{O} \phantom{xx} \text{CH—CH}_3 \\ \diagdown \phantom{x} \diagup \\ \text{CH} \\ | \\ \text{CH}_2\text{CH}_3$$

6. The compound 2-chloro-4,5-diethyl-1,3,2-dioxalumolane having the structural formula:

$$\text{Cl—Al———O} \\ | \phantom{xxx} | \\ \text{O} \phantom{xx} \text{CH—CH}_2\text{CH}_3 \\ \diagdown \phantom{x} \diagup \\ \text{CH} \\ | \\ \text{CH}_2\text{CH}_3$$

7. The compound 2-chloro-1,3,2-dioxaluminane having the structural formula:

$$\text{Cl—Al} \begin{matrix} \diagup \text{O} \diagdown \\ | \phantom{xx} | \\ \text{O} \phantom{xx} \text{CH}_2 \\ \diagdown \phantom{x} \diagup \\ \text{CH}_2 \\ \phantom{x} \diagup \\ \text{CH}_2 \end{matrix}$$

8. The compound 2-chloro-4-methyl-1,3,2-dioxaluminane having the structural formula:

$$\text{Cl—Al} \begin{matrix} \diagup \text{O} \diagdown \\ | \phantom{xx} | \\ \text{O} \phantom{xx} \text{CH}_2\text{—CH}_3 \\ \diagdown \phantom{x} \diagup \\ \text{CH}_2 \\ \phantom{x} \diagup \\ \text{CH}_2 \end{matrix}$$

9. The compound 2-chloro-5-hydroxy-1,3,2-dioxaluminane having the structural formula:

$$\text{Cl—Al} \begin{matrix} \diagup \text{O} \diagdown \\ | \phantom{xx} | \\ \text{O} \phantom{xx} \text{CH}_2 \\ \diagdown \phantom{x} \diagup \\ \text{CHOH} \\ \phantom{x} \diagup \\ \text{CH}_2 \end{matrix}$$

10. The compound 2-chloro-4-propyl-5-ethyl-1,3,2-dioxaluminane having the structural formula:

$$\text{Cl—Al} \begin{matrix} \diagup \text{O} \diagdown \\ | \phantom{xx} | \\ \text{O} \phantom{xx} \text{CH}_2\text{—C}_2\text{H}_5 \\ \diagdown \phantom{x} \diagup \\ \text{CH} \\ | \\ \text{C}_3\text{H}_7 \end{matrix}$$

(References on following page)

References Cited

UNITED STATES PATENTS

| | | |
|---|---|---|
| 2,466,445 | 4/1949 | Landau. |
| 2,823,169 | 2/1958 | Brown et al. |
| 2,872,379 | 2/1959 | Neumann et al. _____ 167—90 |
| 2,877,248 | 3/1959 | Reuter et al. |
| 2,890,987 | 6/1959 | Hilfer _____ 167—90 |
| 2,917,366 | 12/1959 | Hansford. |
| 3,030,274 | 4/1962 | Grant. |
| 3,352,895 | 11/1967 | Holbert et al. |
| 3,359,169 | 12/1967 | Slater et al. |

FOREIGN PATENTS 767,601  2/1957  Great Britain.

OTHER REFERENCES

Mpetse, Chemisches Zentralblatt (1931) II p. 1691. (Copy in Scientific Library QD–1–C7.)

TOBIAS E. LEVOW, *Primary Examiner.*

H. M. S. SNEED, *Assistant Examiner.*

U.S. Cl. X.R.

424—68